Oct. 23, 1928.
L. A. KING
1,688,972
TOY MOTION PICTURE DEVICE
Filed May 29, 1926
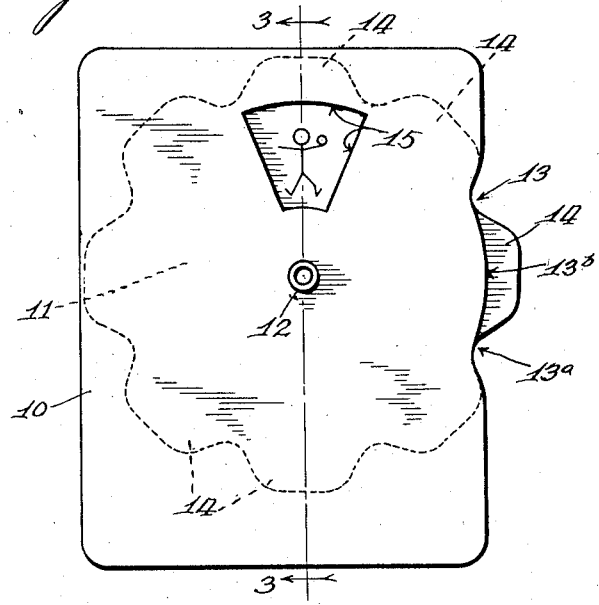
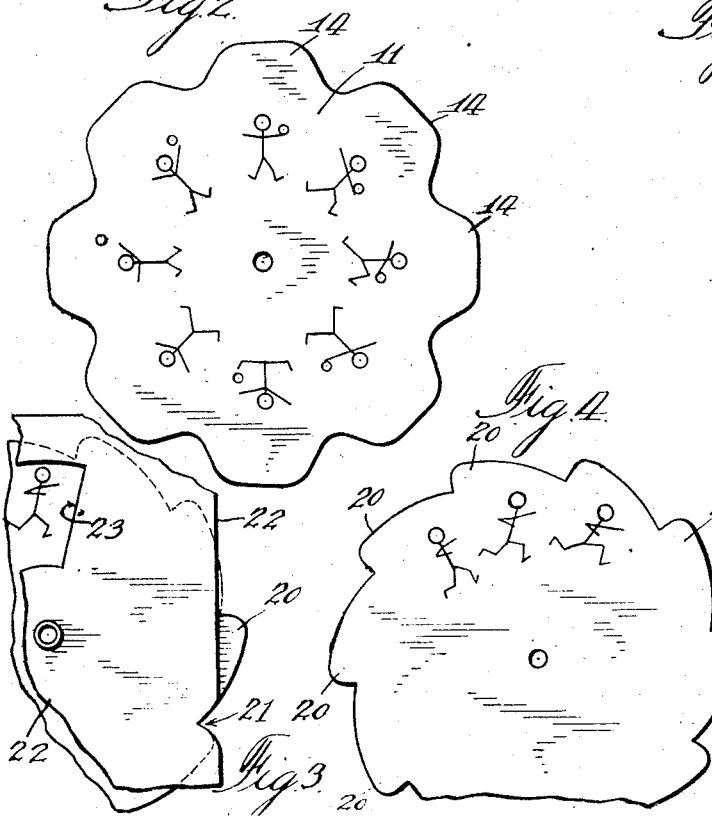
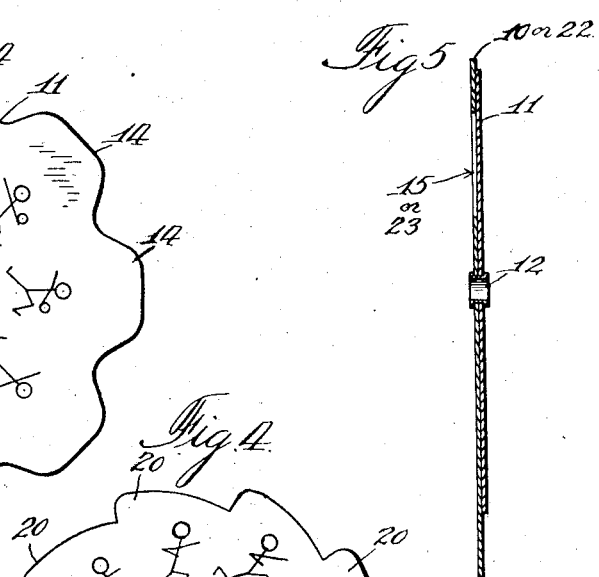
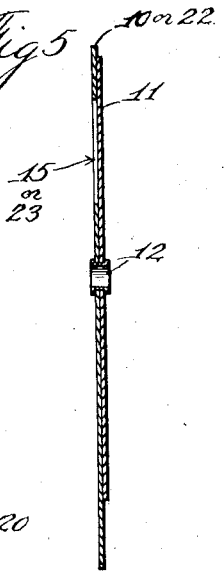
Inventor:
Leland A. King
By Luther Johns
Atty Patented Oct. 23, 1928.

1,688,972

UNITED STATES PATENT OFFICE.

LELAND A. KING, OF CHICAGO, ILLINOIS.

TOY MOTION-PICTURE DEVICE.

Application filed May 29, 1926. Serial No. 112,476.

These improvements relate to motion picture toys of the kind in which there is a rotatable member provided with pictures, with means providing a sight opening through which the operator views the pictures. It is old to provide a motion picture device of such general character and in which the pictures are viewed by reflection from a mirror, as witness my Patents No. 1,526,794 of February 17, 1925, and No. 1,563,090 of November 24, 1925.

The present improvements distinguish from such devices in provisions which avoid the use of a reflecting surface; and one of the objects of these improvements is to provide a toy of this character which is complete without a mirror, thus reducing the number of parts or elements involved, reducing the cost of manufacture, providing a simple device always available for operation, and avoiding certain difficulties attending the positioning of a mirror and the maintenance of a substantially fixed position by the operator before such mirror to obtain the motion picture effects. Another object is to provide a device according to which a somewhat different interesting effect over that of the mirror type mentioned may be had.

In the drawings Figure 1 is a face view of the preferred form of the device complete; Fig. 2 is a face view of the picture-containing element; Figs. 3 and 4 are fragmentary views of another form, corresponding to Figs. 1 and 2 respectively, and Fig. 5 is a medial vertical section which may be considered as taken through the device of Fig. 1 or Fig. 3.

The structure shown in Fig. 1 consists of only three parts, namely, the main support 10, the rotatable element 11, and the pivot means 12 shown in the form of an eyelet rivet passing through the members 10 and 11 and holding them closely together. The parts 10 and 11 in my practice are flat sheet forms cut from cardboard. The operation consists of moving the disc step by step by a finger stroke.

The support 10 is shown as having at its right-hand edge means for facilitating finger contact and for causing the disc to come to rest at the end of each finger stroke. These provisions in Fig. 1 are a pair of recesses 13 and 13ª connected by an arcuate finger guide 13ᵇ, the arrangement being such as to expose successively at the recess or indentation 13 the integral projections 14 formed at the margin of the disc-like member 11. These projections 14 are spaced about equally in the circumferential direction and their number and arrangement are such that when a finger of the operator is applied to one of them at the top of the recess 13 and moved downward so as to rotate the disc a given amount, with the edge 13ᵇ of the support 10 serving as a finger guide, the next projection 14 in the order of movement will correspondingly appear at the recess 13, as shown in Fig. 1. The material at the notch or recess 13ª serves as a finger stop and provides that the rotative movement of the disc by the finger is limited on each stroke to a certain predetermined amount, the finger of the operator slipping or being forced off of each successive projection 14 at the bottom of the recess 13.

In the main support 10, preferably at the top and opposite marginal portions of the disc 11, there is a sight-opening 15. On such marginal portions of the disc 11 a series of pictures is printed or otherwise applied, the pictures being spaced apart equally in such a manner and to such an extent that when any one of the projections 14 is at the recess 13 and ready to be moved downward one picture of the series is opposite the sight-opening 15, and whereby when such projection 14 is moved the full extent provided by the arrangement the next picture in the series will come before the sight opening, and so on, so that with each stroke of the finger the next picture in the series comes into view.

In toy motion picture devices of the kind in which a mirror is employed the rotatable element carrying the pictures is mounted to turn freely, so that by a finger blow or by a wiping stroke with several fingers upon the edge of the disc it will be given a rapid spinning motion carrying the disc through a fairly large number of revolutions. The present device distinguishes from that construction also in the manner of mounting the disc for rotation. If the disc 11 were rotated rapidly the motion picture effect would not be had, but merely a blur would be shown through the sight opening 15. The present improvements proceed on the theory of a distinct step-by-step movement. This is accomplished in the device illustrated by means limiting the finger-impelled movement to a given amount and by means which prevent the disc from moving beyond such amount in the normal operation. In the present form shown the last-mentioned means include the pivoting means. That is to say, the pivot 12 is riveted tightly enough upon the major parts to prevent a spinning motion of the disc, and the connection is tight enough to provide that at the end of each finger stroke the disc will come to rest relative to the frame or support 10. Such an amount of frictional holding may be provided while still leaving the disc free enough to be moved easily.

In operation the person will hold between several fingers and his thumb of the left hand the card or support 10, as by grasping it in the lower left-hand corner. With his right fore-finger he will then strike downward upon the projections 14 in turn, thus successively moving the disc as mentioned. The more rapidly he operates the disc in its step-by-step movement the more rapid and continuous will be the apparent movement of the object or objects illustrated on the disc. By operating his finger two or three times a second the objects illustrated on the disc will give a very definite motion picture effect.

It is conducive to the best results that all of the pictures except the particular one to be viewed at each momentary exposure be concealed, so as to cause the eye to be directed definitely to the place where the pictures successively appear, and also to avoid confusion. In any form of construction the pictures adjacent to the one exposed should be covered over.

Of course the pictures themselves must be such as to indicate successive steps or movements, a matter which is well understood in the picture-making art involved. The characters illustrated in Fig. 2, when exposed as herein indicated, show a single character in the act of tossing a ball and going through various other bodily movements.

Turning to Figs. 3 and 4, the construction and operation are to be considered as being in general the same as in Figs. 1 and 2. A distinction is made in the shape of the projections 20 on the disc of Figs. 3 and 4 and in the finger-guide and finger-stop means. In this instance a single notch, indentation or recess 21 is formed in the edge of the card or support 22. The straight right-hand edge of the card 22 serves as the finger guide. When the finger reaches the recess 21 it is definitely stopped and the amount of rotative movement of the disc is thereby limited. The pictures are viewed through the sight-opening 23 corresponding to the sight-opening 15 of Fig. 1.

When the operator's finger is at the bottom of its stroke in the device of either Fig. 1 or Fig. 3 the next-following projection on the disc constitutes means for stopping the disc with a picture in front of the sight-opening, for such following projection then impinges upon the operator's finger and can move no farther on that stroke. Where this feature is present the frictional resistance between the disc and the support may be very slight—only enough to hold the disc steady. Little more than that is needed in any event, but a fair amount of such frictional holding saves the disc from small unintended movements, as by finger contacts on finger movements preparatory to another stroke.

I have discovered in this connection that if one will take such a disc as is shown in Fig. 2, or in Fig. 4, and hold it at the center between a finger and thumb of the left hand so that the disc will rotate as on a pivotal mounting, and then move the disc with a step-by-step movement by striking the successive projections with a finger of the other hand, using the projecting little finger of the left hand as a stop, certain different and interesting motion picture effects will be had. In such case the eye may select a particular position on the disc successively occupied by the figure and the figure will go through its series of movements in the motion picture sense. At the same time adjacent figures will be going through their movements also.

A still different effect can be had by thus leaving all or a considerable number of pictures exposed to the eye, as by having a different number of pictures on the disc than there are projections, say one less or one more, in which arrangement the object will not only appear to move as to its own parts, but also circumferentially, and the effect will be that of a series of such moving objects traveling around. In Fig. 4 I have shown a few diagrammatic pictures of a man running. If the disc of Fig. 4 be applied to the holder 22, as shown in Fig. 3, the effect will be that of a single person running and advancing, followed presently by another person running and advancing, only one, or, according to the size of the sight opening, say two, of the figures being in view at one time. By simply holding the disc in the hand for rotation, in the manner herein above described and by then giving the disc the described step-by-step movement, the whole series of figures will appear simultaneously to be in running and advancing motion. According to Fig. 4 the man would appear to be running with a great deal of action but moving forward only very slowly.

The use of the disc alone therefore has advantages, and, since articles of this kind are ordinarily gotten up for sale at low prices and are suitable for use as advertising matter given away, the disc part alone has features of utility in various respects. So far as I know it is novel in the provision of projections at the margin or in means for providing a step-by-step movement.

Motion picture effects of the character herein described are such as result from the sequential viewing of pictures arranged in a series and which successively show a given object in a slightly different position or attitude, coupled with the feature of human vision known as the retention of images by or upon the retina of the eye. Merely moving bodily a picture of an object from one position to another does not give rise to motion picture effects of the character herein described.

I contemplate as being included in the present invention such variations, changes and departures from what is thus specifically illustrated and described as fall within the scope of the appended claims.

I claim:

1. A device for providing motion picture effects of the character described comprising a rotatable member in the form of a flat disc having finger-engaging projections on the periphery thereof, a supporting and disc-covering member in the form of a flat sheet having a sight-opening therein, said rotatable member being pivotally mounted on the supporting member and having thereon a series of successively varying pictures for motion picture effects, said pictures being arranged to register successively with said sight-opening when the disc is moved a predetermined amount, said peripheral projections extending beyond an edge of the supporting member and said edge constituting a finger guide whereby a finger applied to such projections respectively may move the rotatable member substantially such predetermined amount only.

2. In a device for providing motion picture effects of the character described, the combination of a cardboard disc having integral marginal projections, a supporting member in the form of a cardboard sheet substantially covering the disc, pivoting means for holding the disc frictionally upon the supporting sheet while providing for a step-by-step rotatable movement thereof, said supporting member having a sight-opening therein, said disc having successively varying pictures thereon adapted successively to register with said sight-opening, said projections extending beyond a margin of the supporting member whereby a finger may be applied thereto to move the disc a predetermined amount, the edge of the supporting member constituting a guide for the finger during each movement, said pictures being so arranged that with each movement of the rotatable member the predetermined amount another picture comes opposite the sight-opening.

3. The combination of claim 2 hereof in which there is a stop carried by the support to limit the finger movement for moving the disc the predetermined amount.

4. The combination of claim 2 hereof in which there is a stop carried by the support to limit the finger movement, and in which the form and arrangement of the projections on the disc are such that when the operator's finger contacts said stop such finger is contacted by the projection next following in the series.

LELAND A. KING.